United States Patent [19]

McAndrew

[11] Patent Number: 4,756,507
[45] Date of Patent: Jul. 12, 1988

[54] BALL OR PLUG VALVE STEM EXTENSION AND LOCK MECHANISM

[76] Inventor: William J. McAndrew, 118 Somerset Rd., Glassboro, N.J. 08028

[21] Appl. No.: 69,876

[22] Filed: Jul. 6, 1987

[51] Int. Cl.⁴ .............................................. F16K 31/46
[52] U.S. Cl. ..................... 251/292; 251/293; 251/288
[58] Field of Search .................. 251/292, 293, 288

[56] References Cited

U.S. PATENT DOCUMENTS

| | | | |
|---|---|---|---|
| 400,944 | 4/1889 | Powell | 251/293 |
| 905,172 | 12/1908 | Godson . | |
| 1,111,865 | 9/1914 | Serrell | 251/293 |
| 1,181,565 | 5/1916 | Block . | |
| 1,355,544 | 10/1920 | Drane et al. . | |
| 1,360,340 | 11/1920 | Wetzler . | |
| 1,433,139 | 10/1922 | Lofton . | |
| 1,754,310 | 4/1930 | Ellenberger . | |
| 1,878,569 | 9/1932 | Zolleis | 251/292 X |
| 2,138,530 | 11/1938 | Wagner | 251/292 |
| 2,198,455 | 4/1940 | Mueller et al. | 251/150 |
| 2,431,527 | 11/1947 | Walters . | |
| 3,582,116 | 6/1971 | Young | 287/53 |

OTHER PUBLICATIONS

*Watt Ball Valve Options and Accessories*, Watts Regulator Company.

*Jamesbury Specifications Bulletin* B160-3, Jamesbury Corp., 1985.

*Primary Examiner*—Arnold Rosenthal
*Attorney, Agent, or Firm*—Thomas A. Lennox

[57] ABSTRACT

A fluid control valve stem extension and locking device includes a rod member to extend the valve stem with a lower end bored and threaded to threadably engage the exposed end of the valve stem with set screws extending horizontally into the bore opening to bear on the sides of the valve stem, the upper end of the extension rod shaped to duplicate the shape of the exposed end of the valve stem and a detached plate having a hole shape to interfit over the exposed end of the valve stem coupled to move with turning of the valve stem and including a stop device duplicating the function of the stopping device used in the valve with a locking mechanism including a cylindrical tube sized to interfit over the stem extension device with an attachment plate structurally attached to the lower end of the tube with a horizontal radial plate structurally attached to the outside surface of the upper end of the tube with two holes corresponding to the valve positions and a locking plate with an opening to interfit over the shape at the upper end of the rod to couple with and move in conjunction with the turning of the valve stem and having a hole to align with either of the two holes in the radial plate and receive a pad lock.

23 Claims, 2 Drawing Sheets

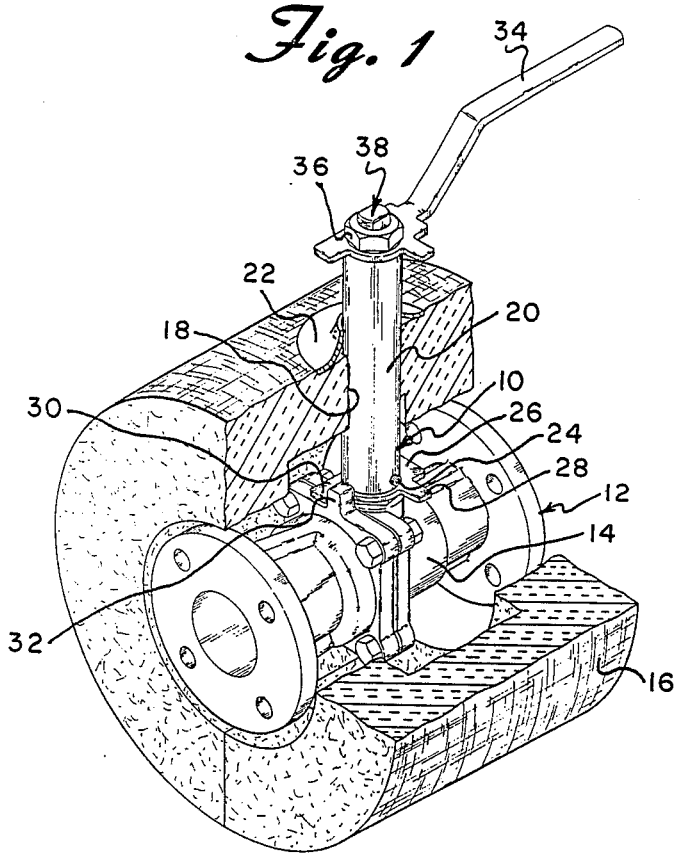
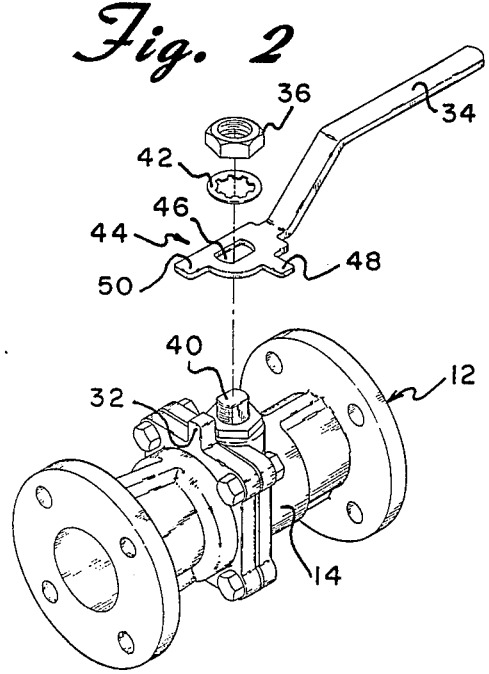
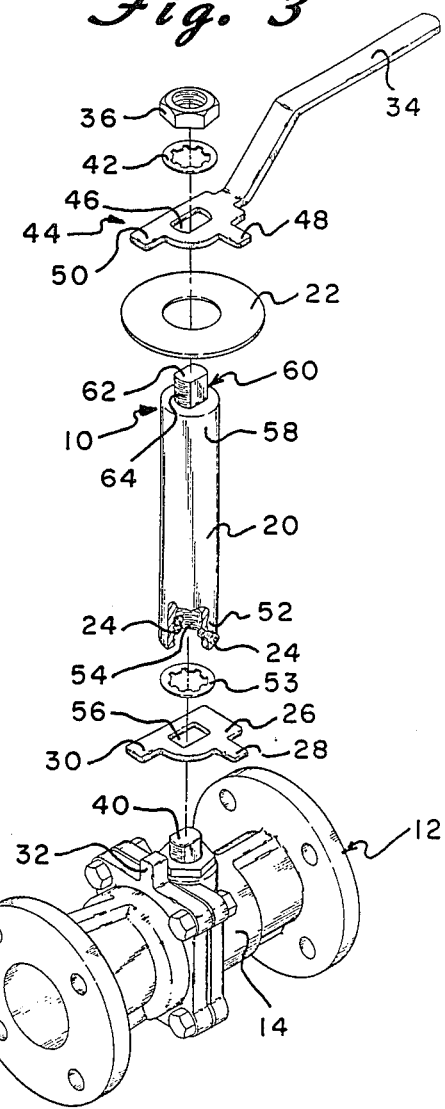

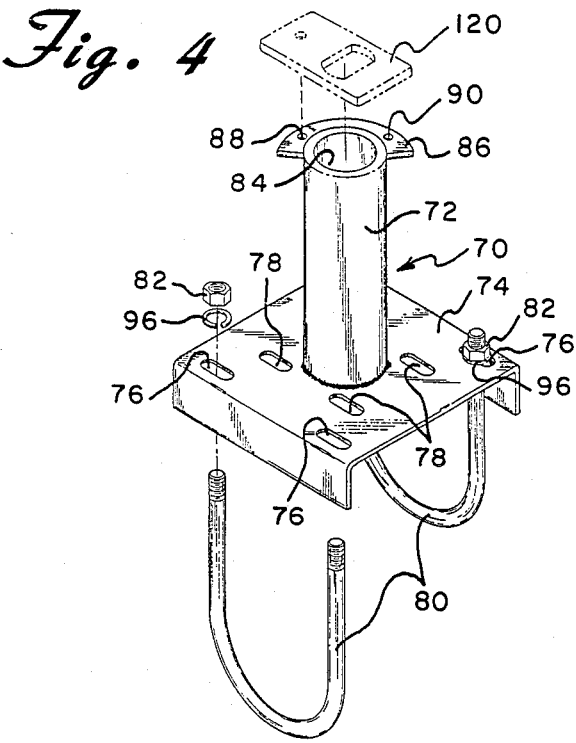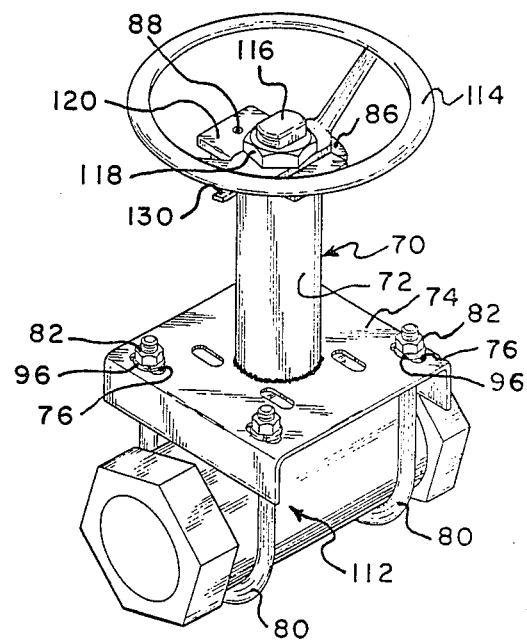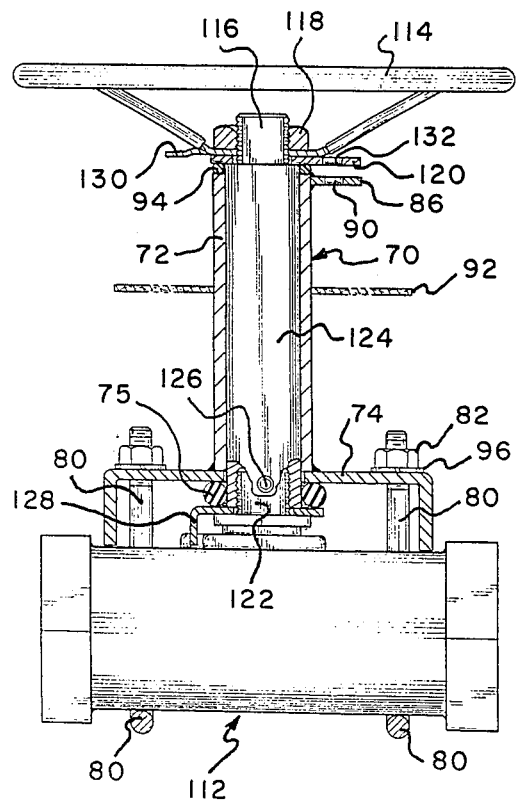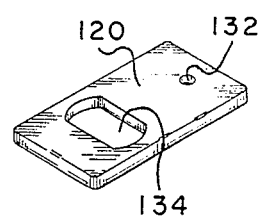

BALL OR PLUG VALVE STEM EXTENSION AND LOCK MECHANISM

BACKGROUND OF THE INVENTION

This invention involves fluid control ball or plug valves and valve stem extensions to allow the valve to be turned free of obstructions located close to the valve body.

Fluid control valves continue to be the most troublesome of continuing maintenance and performance problems in any systems utilizing fluid flow. For example, most of the maintenance problems, in a chemical manufacturing plant or a power plant involve valves in some way or the other. With emphasis on energy conservation, it is now standard practice to insulate most piping systems which are running above or below ambient temperatures. When the insulation is extended to cover the valve body, special arrangements must be made. It is not usually practical to cover up the handle or the wheel used to turn the valve stem to open or close the valve. Valve extensions have been provided in various configurations to extend the handle or wheel to a position outside of the insulation so that the valve can be opened or closed without disrupting the insulation covering.

This invention is directed to ball or plug valves, wherein a one-quarter turn of the wheel or handle changes the flow from full "on" to full "off" in that direction. The valves may be two way, three way or even four way valves. The two way valves have a single flow bore through the ball or plug, while the three way have a "T" shaped bore to provide a third path.

Prior stem extensions such as those supplied by Jamesbury Corporation, of Worcester, Mass. and by Watts Regulator Industrial Products Company of Lawrence, Mass. and extensions described in U.S. Pat. No. 3,582,116 to Steven A. Young and U.S. Pat. No. 905,172 to R. S. Goodson illustrate extensions that utilize bolts and attachment mechanisms that do not provide convenience combined with the necessary durability for industrial use. The loosening or disengagement of a valve extension even after months or years of operation causes a severe safety hazard particularly when high temperature fluids or toxic chemicals are passing through the valve system. A typical Jamesbury extension is welded into place and cannot removed on line.

An additional problem involves the necessity of locking the valves in position, either in an open position or in the closed position. Again, because of safety considerations, such as when maintenance is being undertaken on the line, it is typically absolutely necessary to prevent unauthorized changing of the valve closure position. A number of locking mechanisms are provided in the industry to prevent unauthorized opening or closing of control valves, but the use of insulation on the pipes with a valve stem extension poses problems and needs not satisfied by these prior devices. It is necessary to provide a locking mechanism wherein the valve handle may be locked in either an open or a closed position without disrupting the insulation when the valve closure is to be changed. Further, it is important that water and other fluids cannot penetrate along the valve stem extension into and under the insulation to cause corrosion or other maintenance problems for the valve and the insulation covering.

None of the prior art devices satisfy these needs nor attain the objects described herein below.

SUMMARY OF THE INVENTION

This invention is used in conjunction with a fluid control valve having a body, a valve stem having an exposed end on which a valve turning device detachably attaches. The valve stem rotates the valve stem to adjust fluid flow through the valve and a stopping device is included to stop rotation of the valve stem in a full open position to open the valve and in a closed position to close the valve. Typical valve turning devices are handles, wheels and motor driven mechanisms. Typical stopping devices are metal tabs extending either outwardly horizontally from the valve stem or outwardly and downwardly to engage a pair of stops, usually molded into the valve body. The invention is a valve stem extension device including a rod member, preferably a circular rod, having an upper end. The rod member is of sufficient length to position the valve turning device now attached to the upper end of the rod member at a position to move free of any obstruction, such as insulation surrounding the valve. The rod member has a lower end with a bore opening into that end having a female mating shape of a cylindrical threaded bore having threads mating to the exposed end of the valve stem with two set screws threadably engaged through horizontal holes in the side of the rod member opening into the bore opening to bear on the end of the stem mated into to the bore opening. The upper end of the rod is a shape to sufficiently duplicate the shape of the exposed end of the valve stem to allow the valve turning device to be securely fastened thereon. Preferably, when the stopping device is structurally attached to the valve turning device, the device further includes a plate having a hole of a shape to interfit over the exposed end of the valve stem and coupled with that exposed end to move with turning of the valve with the plate further including a stop device duplicating the function of the stopping device of the fluid control valve. The preferred shape of the exposed end of the valve stem is such that if a member with a hole of that shape is interfitted over the exposed end and the member is turned, the valve stem will turn. It is particularly preferred that the exposed end of the valve stem be threaded.

The device of the present invention is preferably connected to valves having a threaded exposed end of the stem. It is further preferred that the exposed end of the stem be rectangular in cross-section and be threaded on at least two vertical sides having at least one flat side. It is most preferred that the present invention be connected to valves having an exposed end of the stem having two vertical flat sides and with the device having two set screws engaged through the side of the rod to bear on the opposite flat sides of the exposed end. It is preferred that the device include a wide flexible water shed, annular elastomeric washer snugly interfitting onto the rod member of sufficient size to direct any liquid away from the rod extension.

An embodiment of the valve stem extension device of the present invention includes a cylindrical tube having an internal size sufficient to interfit over the stem extension device preferably the rod member allowing the rod to rotate freely inside the tube. The tube has an upper end and a lower end and an attachment device structurally attaches the lower end of the tube to the valve body. A horizontal radial plate is structurally attached to an outside surface of the upper end of the tube having at least two vertical holes extending through the radial plate, one hole positioned in relation to the full open position of the valve and one hole positioned in relation to the closed position of the valve. A locking plate is provided having an opening to interfit over the shape on the upper end of the rod and further shaped to coupled with and move in conjunction with turning of the valve stem. The locking plate has a hole to align with the holes in the radial plate by turning the valve stem to the appropriate position. It is preferred that a locking device be provided to insert through the aligned holes in the radial plate and the locking plate to prevent unauthorized rotation of the valve stem. The preferred attachment device includes an attachment plate to which the cylindrical tube is structurally attached, the plate having a plurality of holes through which bolt atachment devices attach the plate to the valve body. Preferred bolt attachment devices include a pair of "U" bolts of a size and shape to interfit around the valve body and extend into four holes in the attachment plate to receive nuts to hold the attachment plate securely to the valve body. It is preferred that a first vapor seal flexible elastomeric washer be compressed between the locking plate and the upper end of the cylindrical tube and a second vapor seal washer be provided that is sized to snugly fit over the outside of the rod member and compressed between the attachment plate and a rigid washer moving in conjunction with the rod member, such as the stopping plate.

It is an object of the present invention to provide a valve stem extension for use on a fluid control valve which provides a high degree of durability and near absolute assurance that the valve stem extension will not break or become inadvertently disengaged from the valve stem.

It is a further object of the present invention to provide a valve stem extension mechanism that can be effectively used with insulation packed around the valve body and prevent liquid penetration along the stem into and under the insulation.

It is an additional object of the present invention to provide a fluid control valve stem extension which provides a duplicate stop mechanism to stop the valve stem for turning past either a full closure position or a full open position.

It is a further object of the present invention to provide a valve stem extension system with a locking mechanism so that the valve stem may be locked into position to prevent unauthorized opening or closure of the valve wherein the locking mechanism does not interfere with any obstructions surrounding the valve body.

It is a further object of the present invention to provide a fluid control valve locking mechanism having universal application fitting a wide variety of fluid control valve types and sizes, and useful with a wide variety of valve stem extension devices.

It is a particular object of the present invention to provide a fluid control valve stem extension which may be attached to the valve stem after the valve is on line, using simple tools and procedures, but is essentially assured of permanent attachment during operation of the valve.

It is a further object of the present invention to provide a locking mechanism for a fluid control valve stem extension to prevent unauthorized movement of the valve handle and in addition provide protection from liquid invasion along the valve stem extension to the valve body and the piping system.

It is an additional object of the present invention to provide a valve stem extension and locking mechanism with a vapor seal, sealing the valve stem from the atmosphere.

BRIEF DESCRIPTION OF THE DRAWINGS

FIG. 1 is a perspective view illustrating a fluid control valve stem extension device of the present invention.

FIG. 2 is a perspective, partially exploded view of a typical fluid control valve.

FIG. 3 is an exploded view of the fluid control valve stem extension device illustrated in FIG. 1.

FIG. 4 is a partially exploded view of a fluid control valve stem extension locking mechanism of the present invention.

FIG. 5 is a perspective view of the fluid control valve stem extension locking mechanism illustrated in FIG. 4 attached to a valve and a stem extension mechanism.

FIG. 6 is a partial vertical cross-sectional view taken from FIG. 5 illustrating the fluid control valve stem extension locking mechanism.

FIG. 7 is a perspective view of a locking plate used in the fluid control valve stem extension locking mechanism illustrated in FIGS. 5 and 6.

DESCRIPTION OF PREFERRED EMBODIMENTS

Fluid control valve stem extension 10 is illustrated in FIG. 1 attached to valve 12 which includes valve body 14. Insulation 16 completely surrounds and incases valve 12 except for hole 18 through which stem extension rod member 20 extends to a position outside and away from insulation 16. Elastomeric washer 22 snugly interfits on rod 20 and is of sufficient width to distribute moisture away from hole 18 and prevent it from leaking into and under insulation 16. Washer 22 is preferably of a highly chemical resistant elastomeric polymer such as EDPM, marketed under the trademark NORDEL, E. I. DuPont DeNeMours, Inc., but may be constructed of like quality polymers. Stem extension mechanism 10 includes rod 20 which is engaged to an exposed end of the valve stem and held in position with allen screw 24 sandwiching stop plate 26 which includes stop tab 28 which abuts stop 32 when valve 22 is closed and stop tab 30 which engages stop 32 when valve 12 is in the full open position. At the upper end of rod extension 20, handle 34 is attached with nut 36 to shape 38 which is an exact duplicate of the exposed end of the exposed end of the valve stem hidden in this view.

In FIG. 2 typical fluid control valve 12 is illustrated showing exposed end 40 of the valve stem extending outwardly from valve body 14. End 40 is rectangular in cross-section with threads cut into two opposite faces. Turning exposed end 40 opens or closes valve 12. Handle 34 is attached to end 40 using nut 46 and lock washer 42. Attachment end 44 of handle 34 includes rectangular hole 46 which intefits over and engages the rectangular shape of exposed end 40 such that handle 34 provides the necessary torque to turn the valve stem. Attachment end 44 also includes tabs 48 and 50 which perform in the same fashion as tabs 28 and 30 described above.

In FIG. 3, an exploded view of extension mechanism 10 illustrating rod 20 interfitting over and threadably engaged to exposed end 40 of valve 12. Lower end 52 of rod 20 is bored out with threads 54 matched to the threads on exposed end 40. Two allen set screws 24 extend through the body of rod 20 into the bored out end to engage the flat faces of exposed end 40 which is in a general rectangular shaped threaded on two ends. Stop plate 26 includes tab stops 28 and 30 and rectangular hole 56 which interfits over exposed end 40 to move in conjunction with the valve stem. Thus, when engaged and attached securely, rod 20 and stop plate 26 move in conjunction with the valve stem of valve 12. At upper end 58 of extension rod 20 is located shape 60 which is an exact duplicate of exposed end 40 of the valve stem. In this case, shape 60 includes rectangular extension shape 62 structurally attached and in this case as an integral part of rod 20 extending in the same direction as the rod with threads 64 matching the threads on exposed end 40. Handle 34 attached to shape 60 using nut 36 and lock washer 42 as attachment end 44 interfits over rectangular extension 60 in the same fashion as it attached to exposed end 40 of the valve stem. Thus, attachment of handle 34 to valve stem extension 10 is at least as good as it was to valve 12 itself. Stop plate 26 is an exact duplicate of attachment end 44 of the handle. By duplicating the shape of the attachment hole and the tab positions handle 34 is stopped in the same fashion as it was when it was attached directly to valve 12.

In FIG. 4, locking mechanism 70 is illustrated before it is attached to valve 112. Locking mechanism 70 includes cylindrical tube 12 which is welded to attachment plate 74 having a plurality of holes including holes set 76 and holes set 78. Elongated holes 76 are positioned to receive "U" bolts 80 which extend through pairs of holes 76 and attached with nuts 82. Holes 78 are positioned to receive bolts which threadably engage directly into holes commonly provided in valve body casings to attach meters and other devices to the valves. In many cases, these threaded holes in the casing may be easily used to attach attachment plate 74 to the valve body. Cylindrical tube 72 has inside area cavity 84 which extends the entire length of tube 72 and opens through attachment plate 74 below of a size that permits a fluid control valve stem extension device to freely turn inside the cylindrical tube. Radial plate 86 is horizontally welded to tube 72 proximate the upper end and extends around the outside surface of tube 72 a sufficient distance to position holes 88 and 90 which relate to the full open position of the valve and the full closed position to the valve, respectively.

In FIG. 5, locking mechanism 70 is attached through "U" bolts 80 to valve 112. The threads on the ends of "U" bolts 80 may be easily crushed to prevent removal of nuts 82 after locking mechanism 70 is securely attached to prevent unauthorized removal of the locking mechanism. When the locking mechanism is to be removed by authorized personnel, an easy but time consuming rethreading of the ends of the "U" bolts will allow removal of nuts 82. In the alternative, special locking nuts may be used on the ends of the "U" bolts to prevent unauthorized removal of the locking mechanism. Wheel 114 is attached to valve stem extension member 116 with nut 118, the entire movement of that mechanism being free to rotate within cylindrical tube 72. Locking plate 120, mostly obscured in this view, is attached and held with nut 118 to move in conjunction with valve stem extension 116 such that it rotates horizontally in relation to horizontal radial plate 86.

In FIG. 6, locking mechanism 70 is shown attached through "U" bolts 80 to valve 112 which includes valve stem end 122 on which is attached valve stem extension 124 by threaded engagement and allen bolts 126. Stop plate 128 duplicates the shape including the downward extending tab to that from turning wheel 114. Stop plate 128 includes a hole shape which interfits over valve stem end 122 so that it moves in conjunction with the valve stem to abut stops molded in the body of valve 112 relating to the open position of the valve and a full closed position of the valve. At the upper end of locking mechanism 70, locking plate 120 is sandwiched and held in position by nut 118 to move in conjunction with stem extension 124 and the valve stem of valve 112. Thus, when valve extension 124 is rotated, lock plate 120 is also rotated such that hole 132 aligns with either hole 88 or hole 90 which relate to either the full open position of valve 112 or the full closed position of valve 112 respectively. Flexible rubber washer 92 snugly interfits around cylinder 72 and operates in the same fashion as elastomeric polymeric washer 22 illustrated in FIG. 1. Flexible "O" ring rubber washer 94 is snugly interfitted over valve extension rod 124 and prevents water intrusion between stem extension rod 124 and the inside of cylindrical tube 72. Washer "O" ring 94 snugly interfits around extension rod 124 and is compressed under locking plate 120 against the top edge of tube 72. Stop tab 130 is either broken off or bent upwardly (as shown) so as to not interfere with the locking mechanism. Alignment of the holes allows insertion of a locking mechanism, such as a keyed pad lock to engage hole 132 and either holes 88 or 90 depending upon the intended locked position of valve 114. Flexible washer "O" ring 75 interfits around extension rod 124 and is pressurably sealed between stop plate 128 and the bottom surface of attachment plate 74. Whenever a part is to move in conjunction with the valve stem or its extension, the shape of the exposed end of the stem or its extension is such that if a member with a hole of that shape is interfitted over the end and the member is turned the valve stem will turn or visa versa. Where the end of the valve stem is not threaded a connecting member is added with a lower end interlocking with the exposed end and having a threaded upper end with flat faces to receive the set screws. In some cases it is not necessary to reproduce the exposed end exactly on the upper end of the rod member as it only need be reproduced sufficiently to allow secure fastening of the valve turning device. In FIG. 7, locking plate 120 shows the relative position of hole 132 and attachment hole 134 which is in a general rectangular shape to interfit over extension end 116 so that it will move in conjunction with extension 124.

The combination of washers 75 and 94 provides a vapor seal of the extension locking device.

While this invention has been described with reference to the specific embodiments disclosed herein, it is not confined to the details set forth and the patent is intended to include modifications and changes which may come within and extend from the following claims.

I claim:

1. In a fluid control ball or plug valve having a body, a valve stem having an exposed end on which a valve turning means detachably attaches to rotate the valve stem to adjust fluid flow through the valve, and a stopping device structurally attached to the valve turning means, the stopping device stopping rotation of the valve stem in a full open position to open the valve and in a closed position to close the valve, a valve stem extension device comprising:

(a) a rod member having an upper end and of sufficient length to position the valve turning means attached to the upper end at a position movably free of obstruction, (b) a lower end of the rod member having a threaded cylindrical bore opening to the lower end having threads mating to the exposed end of the valve stem, (c) two set screws threadably engaged through horizontal holes in the side of the rod member opening into the bore opening to bear on the end of the stem mated into the bore opening, (d) the upper end of the rod of a shape to duplicate the cross-sectional shape of the exposed end of the valve stem, and (e) a plate having a hole of a shape to interfit over the exposed end of the valve stem and coupled to move with turning of the valve stem, the plate comprising a stop means duplicating the function of the stopping device.

2. The valve stem extension device of claim 1 wherein the exposed end of the stem has rectangular cross-section and is threaded on at least two vertical sides and has at least one flat side.

3. The valve stem extension device of claim 1 wherein the exposed end of the stem has two flat vertical sides and the set screws engage through the side of the rod bear on the flat sides of the exposed end of the valve stem.

4. The valve stem extension device of claim 1 wherein the exposed end of the stem is not threaded and the valve stem extension device further comprises a mating means to attach at one end to the exposed end of valve stem and having a threaded rectangular projection at the other end to interconnect with the rod member.

5. The valve stem extension device of claim 1 wherein a flexible elastomeric washer snugly interfits onto the rod member.

6. The valve stem extension device of claim 1 further comprising:
(a) a cylindrical tube having an internal size sufficient to interfit over the rod member allowing the rod to rotate freely inside the tube, the tube having an upper end and a lower end,
(b) an attachment means structurally attached to the lower end of the tube to attach the tube to the valve body,
(c) a horizontal radial plate structurally attached to an outside surface of the upper end of the tube, having at least two vertical holes extending through the radial plate, a first hole positioned in relation to the full open position of the valve and a second hole positioned in relation to the full closed position of the valve, and
(d) a locking plate having an opening to interfit over the shape on the upper end of the rod, and shaped to couple with and move in conjunction with turning of the valve stem and having a hole to align with the first hole in the radial plate when the valve stem is in the full open position and with the second hole when the valve stem is in the full closed position.

7. The valve stem extension device of claim 6 further comprising a locking means inserted through the aligned holes in the radial plate and the locking plate to prevent unauthorized rotation of the valve stem.

8. The valve stem extension device of claim 6 wherein the attachment means comprises an attachment plate having a plurality of holes through which bolt attachment means attach the plate to the valve body.

9. The valve stem extension device of claim 8 wherein the bolt attachment means comprises a pair of "U" bolts of a size and shape to interfit around the valve body and extend into four holes in the attachment plate to receive nuts to hold the attachment plate securely to the valve body.

10. The valve stem extension device of claim 6 wherein a flexible elastomeric washer snugly interfits over the outside of the cylindrical tube between the radial plate and the attachment plate.

11. The valve stem extension device of claim 6 wherein a first vapor seal washer is compressed between the locking plate and the upper end of the cylindrical tube and a second vapor seal washer snugly interfits around the rod member and is compressed between an attachment plate of the attachment means and rigid washer interlocked at the lower end and moving in conjunction with the rod member.

12. The valve stem extension device of claim 11 wherein the rigid washer is a plate comprising a stop means stopping rotation of the valve stem in a full open position to open the valve and in a closed position to close the valve, the plate further comprising a hole of a shape to interfit over the exposed end of the valve stem and coupled to move with turning of the valve stem.

13. A valve stem extension device for use on a fluid control valve comprising:
(a) a rod member having an upper end and having sufficient length to position a valve turning means attached to the upper end at a position movably free of obstruction,
(b) a lower end of the rod member having a threaded cylindrical bore opening to the lower end having threads mating to the exposed end of the valve stem,
(c) two set screws threadably engaged through horizontal holes in the side of the rod member opening into the bore opening to bear on the end of the stem mated into the bore opening,
(d) the upper end of the rod of a shape to duplicate the cross-sectional shape of the exposed end of the valve stem, and
(e) a plate having a hole of a shape to interfit over the exposed end of the valve stem and coupled to move with turning of the valve stem, the plate comprising a stop means stopping rotation of the valve stem in a full open position to open the valve and in a closed position to close the valve.

14. The valve stem extension device of claim 13 wherein the exposed end of the valve stem has a rectangular cross-section and is threaded on at least two vertical sides and has at least two flat sides.

15. The valve stem extension device of claim 13 wherein the exposed end of the stem has two flat vertical sides and the set screws engage through the side of the rod bear on the flat sides of the exposed end of the valve stem.

16. The valve stem extension device of claim 13 wherein the exposed end of the stem is not threaded and the valve stem extension device further comprising a mating means to attach at one end to the exposed end of valve stem and have a threaded rectangular projection at the other end to interconnect with the rod member.

17. The valve stem extension device of claim 13 wherein a flexible elastomeric washer snugly interfits onto the rod member.

18. The valve stem extension device of claim 13 further comprising:
(a) a cylindrical tube having an internal size sufficient to interfit over the rod member allowing the rod to rotate freely inside the tube, the tube having an upper end and a lower end,
(b) an attachment means structurally attached to the lower end of the tube to attach the tube to the valve body,
(c) a horizontal radial plate structurally attached to an outside surface of the upper end of the tube, having at least two vertical holes extending through the radial plate, a first hole positioned in relation to the full open position of the valve and a second hole positioned in relation to the full closed position of the valve, and
(d) a locking plate having an opening to interfit over the shape on the upper end of the rod, and shaped to couple with and move in conjunction with turning of the valve stem and having a hole to align with the first hole in the radial plate when the valve stem is in the full open position and with the second hole when the valve stem is in the full closed position.

19. The valve stem extension device of claim 18 further comprising a locking means inserted through the aligned holes in the radial plate and the locking plate to prevent unauthorized rotation of the valve stem.

20. The valve stem extension device of claim 18 wherein the attachment means comprises an attachment plate having a plurality of holes through which bolt attachment means attach the plate to the valve body.

21. The valve stem extension device of claim 20 wherein the bolt attachment means comprises a pair of "U" bolts of a size and shape to interfit around the valve body and extend into four holes in the attachment plate to receive nuts to hold the attachment plate securely to the valve body.

22. The valve stem extension device of claim 18 wherein a flexible elastomeric washer snugly interfits over the outside of the cylindrical tube between the radial plate and the attachment plate.

23. The valve stem extension device of claim 18 wherein a first vapor seal washer is compressed between the locking plate and the upper end of the cylindrical tube and a second vapor seal washer snugly interfits around the rod member and is compressed between an attachment plate of the attachment means and rigid washer interlocked at the lower end and moving in conjunction with the rod member.

* * * * *